(12) United States Patent
Almhill et al.

(10) Patent No.: US 9,834,152 B2
(45) Date of Patent: Dec. 5, 2017

(54) LOAD CARRIER FOOT

(71) Applicant: Thule Sweden AB, Hillerstorp (SE)

(72) Inventors: Stefan Almhill, Taberg (SE); Claes Johansson, Åsenhöga (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 15/111,718

(22) PCT Filed: Feb. 4, 2015

(86) PCT No.: PCT/EP2015/052254
§ 371 (c)(1),
(2) Date: Jul. 14, 2016

(87) PCT Pub. No.: WO2015/117990
PCT Pub. Date: Aug. 13, 2015

(65) Prior Publication Data
US 2016/0339849 A1 Nov. 24, 2016

(30) Foreign Application Priority Data
Feb. 7, 2014 (EP) .................................... 14154337

(51) Int. Cl.
*B60R 9/058* (2006.01)
(52) U.S. Cl.
CPC .................................. *B60R 9/058* (2013.01)
(58) Field of Classification Search
CPC ............ B60R 9/058; B60R 9/04; B60R 9/052
USPC ................................................ 224/329–331
See application file for complete search history.

(56) References Cited

U.S. PATENT DOCUMENTS

| 5,492,258 | A | | 2/1996 | Brunner |
| 5,556,221 | A | * | 9/1996 | Brunner .................. B60R 9/045 224/321 |
| 5,779,116 | A | * | 7/1998 | Rosch ..................... B60R 9/045 224/319 |

(Continued)

FOREIGN PATENT DOCUMENTS

| DE | 10 2011 082421 | 3/2003 |
| EP | 1 783 001 | 5/2007 |
| FR | 2 879 536 | 6/2006 |

OTHER PUBLICATIONS

International Search Report and Written Opinion of the International Searching Authority for International Appl. No. PCT/EP2015/052254, European Patent Office, Rijswijk, Netherlands, dated Feb. 27, 2015, 9 pages.

*Primary Examiner* — Corey Skurdal
(74) *Attorney, Agent, or Firm* — Sterne, Kessler, Goldstein & Fox P.L.L.C.

(57) ABSTRACT

A load carrier foot includes a support body having a support surface configured to rest against a first surface of a vehicle, a first bracket configured to grip about a second surface of the vehicle, a second bracket configured to grip about a third surface of the vehicle, and a tensioning arrangement configured to impart a clamping force at between the support surface and the first and the second brackets to retain the load carrier foot to the vehicle. The first and the second brackets are pivotally connected to each other. A load carrying foot according to the present invention has relatively few components while still providing a rigid and strong connection to the vehicle.

21 Claims, 9 Drawing Sheets

(56) References Cited

U.S. PATENT DOCUMENTS

| | | | |
|---|---|---|---|
| 6,622,898 B1* | 9/2003 | Wang | B60R 9/045 |
| | | | 224/321 |
| 2004/0211801 A1* | 10/2004 | Barbara | B60R 9/045 |
| | | | 224/319 |
| 2008/0034561 A1* | 2/2008 | Emmerling | B60R 9/055 |
| | | | 24/514 |
| 2008/0110949 A1* | 5/2008 | Adamczewski | B60R 9/02 |
| | | | 224/329 |
| 2012/0228348 A1 | 9/2012 | Aftanas | |
| 2014/0183235 A1* | 7/2014 | Hubbard | B60R 9/058 |
| | | | 224/309 |

* cited by examiner

LOAD CARRIER FOOT

TECHNICAL FIELD

A load carrier foot of clamping type comprising a support surface, a bracket and a tensioning arrangement to impart a clamping force between the support surface and the bracket. The tensioning arrangement comprises a lever and can be operated by a user using his/hers hands.

BACKGROUND

Roof racks for vehicles are during use exposed to very harsh environmental conditions such as rain, snow, wind, dirt and the like. They are further expected to withstand a high amount of crash violence, e.g. from a colliding vehicle. These requirements impede restrictions to the materials selected, the shape and the form of the roof rack and its components.

A roof rack generally has a first and a second load carrier foot and a load carrying bar extending there between. It is important that the load carrier feet are mounted and attached correctly to the vehicle roof. Different types of load carrier feet have been developed. One type of load carrier foot is a fix-point load carrier foot. A fix-point load carrier foot uses fixed positions on the vehicle roof to attach the load carrier foot. Usually a nut welded to the vehicle roof, or welded to the vehicle roof chassis, serves as a fixed anchoring point for a fix-point load carrier foot. A draw back with a fix-point load carrier foot is of course the limited amount of available positions at which the load carrier foot can be positioned.

Another type of load carrier foot is a load carrier foot of clamping type. Such a load carrier foot uses clamping force between a support surface and a bracket as main attachment principle. An advantage with this type of load carrier foot is that they can be positioned in a plurality of different positions, generally along a rail arranged on the roof of the vehicle. Load carrier feet of clamping type are however susceptible to some drawbacks. A load carrier foot of clamping type is disclosed in the U.S. Pat. No. 5,492,258, Happich GMBH. One drawback is that they generally tend to use the friction provided by the clamping force to rely on a sturdy attachment to the vehicle rail, or vehicle roof. There is also the risk of a load carrier foot of clamping type not being mounted correctly. The ease of which a load carrier foot can be mounted and the semantics which is projected to a user are important factors to reduce the risk of a user mounting a load carrier foot of clamping type incorrectly.

Further, using tools is considered less favorable when mounting load carrier foots. Tools are not always at hand, and tools further increase the risk of imparting to high amount of torque when tightening, e.g. tightening a screw on a load carrier foot to tight. It is thus advantageous to provide a load carrier foot which can be operated by a user using his/hers hands as a complement or replacement to tools.

SUMMARY

It is an object of the present invention to reduce at least one of the drawbacks of the prior art, or to provide for a useful alternative. The objects are at least partly met by a load carrier foot comprising a support body comprising a support surface adapted to rest against a first surface of a vehicle. A first pivotable bracket adapted to grip about a second surface of the vehicle, a second pivotable bracket adapted to grip about a third surface of the vehicle, and a tensioning arrangement adapted to impart a clamping force at between the support surface and the first and the second pivotable brackets to retain the load carrier foot to the vehicle.

The first and the second pivotable brackets are hereafter referred to only as the first and the second brackets.

The first and the second brackets are pivotally connected to each other. Optionally or additionally each of the first and the second brackets comprises at least two connection flanges, and in that the connection flanges of the first bracket are positioned adjacent the connection flanges of the second bracket.

The load carrier foot has a very favourable and strong connection to the vehicle as the tensioning arrangement together with a first and a second brackets and a support surface of the support body form a three-point force component attachment configuration, each force component having a direction which is different with respect to each other.

According to an embodiment, at least one of the first and the second brackets are pivotally connected to the support body of the load carrier foot. One bracket or both brackets can be pivotally connected to the support body of the load carrier foot. In an embodiment, the first bracket is pivotally connected to the support body of the load carrier foot and the second bracket is pivotally connected to the first bracket.

The first and the second brackets can be pivotally connected to the support body at one or more common connection points. One common connection point, or connection axle, is advantageous as it simplifies the assembly of the load carrier foot and reduces the amount of individual components of the load carrier foot. It is also advantageous as the first and the second brackets are pivotally connected to each other and to the support body of the load carrier foot at one common point, using a common axle.

The first and the second brackets are preferably formed by sheet steel, such as pressed sheet steel. The support body of the load carrier foot is also preferably made from sheet steel. Composites and reinforced plastic material may be used.

The first and the second brackets can be pivotally connected to the support body using one or more common connection axles. It is possible that the first and the second brackets are connected to the support body of the load carrier foot using two axles aligned with each other, or as disclosed herein, one single axle.

The first and the second brackets each has a first end forming a gap there between, the gap being adapted to receive a portion of the vehicle, such as a rail of the vehicle.

The first bracket and/or the second bracket can be connected using a circular aperture through which a connection axle extends. As an option, the first and/or the second brackets comprises an elongated aperture for receiving the connection axle. By using an elongated aperture, the first and/or the second brackets can be displaceable a distance defined by the elongated aperture of the first bracket and the connection axle. The displacement of the first and/or the second brackets are dependent on the available play between the connection axle and the aperture. It is possible that only one of first or the second brackets are provided with an elongated aperture so as to permit the bracket to be displaced a limited distance, the other bracket may be provided with a circular aperture, preferably having a diameter only lightly larger than the diameter of the connection axle.

The elongated aperture of the first bracket can have an extension which is longer than the extension of the elongated aperture of the second bracket.

The tensioning arrangement is arranged to clamp, or operate, on the first and the second brackets on a position between the gap and the one or more common connection points.

The tensioning arrangement can comprise an elongated member, such as a screw or bolt, extending between the first and the second brackets. A cam member connected to the elongated member can be connected to the elongated member. The cam member is adapted to impart a clamping force between the first and the second brackets. The cam member is preferably adapted to translate a rotational motion of the cam member to a forward motion of the bracket on which the cam member operates with the purpose of reducing the distance between the first and the second brackets.

The first and the second brackets can be provided with at least one connection flange at which the first and the second brackets are connected. The at least one connection flange of the first and the second brackets can be positioned substantially adjacent each other, preferably adjacent each other. By having connection flanges which are positioned adjacent each other, the first and the second brackets forms a layered section, or a laminate or sandwich structure. The adjacent layers provide stability to the load carrier foot.

The at least one connection flange of the first and/or the second brackets and a portion of the support body can positioned substantially adjacent each other, preferably adjacent each other. A three layered structure is provided in this manner. If each bracket comprises two connection flanges, a double three layered structure or section is provided.

Each bracket can comprise two or more connection flanges. The connection flanges of the first and the second brackets can be provided with elongated apertures as disclosed herein.

The at least one connection flange extends from a main portion of the first and/or the second brackets and is advantageously arranged substantially perpendicular to the main portion. Each bracket, i.e. both the first and the second brackets can thus be provided with two parallel connection flanges extending out from a main portion of the bracket.

The first and/or the second the two connection flanges is arranged at opposing sides of the main portion of the first and the second bracket. If a bracket used for the load carrier foot described herein has three connection flanges, a suitable cross section could be an E-shaped cross section, i.e. having three parallel connection flanges extending out from a main portion of the bracket. When having only two connection flanges, the centrally arranged connection flange will be omitted.

The load carrier foot can comprise a secondary support body. A secondary support body can advantageously be positioned between a portion of the first and/or the second bracket. Such portion is preferably a connection flange of the first and/or the second bracket.

BRIEF DESCRIPTION OF THE DRAWINGS

Non-limiting embodiments of the present invention will be described in greater detail with reference to the accompanying drawings in which.

DETAILED DESCRIPTION OF PREFERRED EMBODIMENTS

Figure 1:
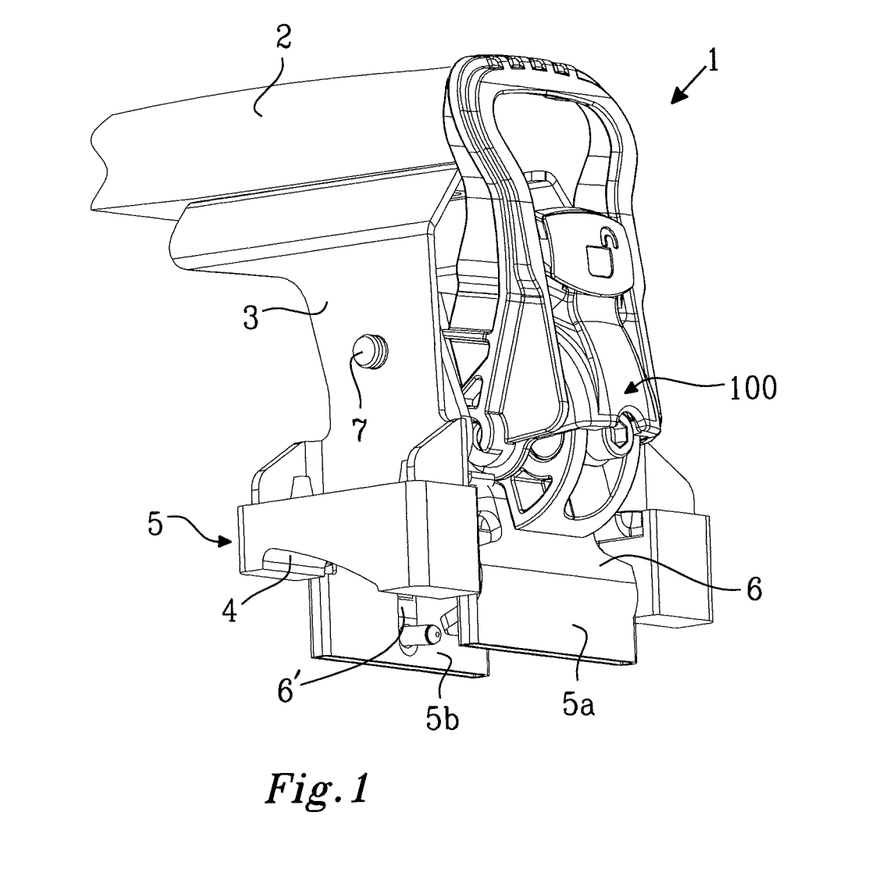
FIG. 1 shows a load carrier foot according to a first embodiment with a perspective view.

FIG. 1 shows a load carrier foot 1 and parts of a load carrying bar 2. The load carrier foot 1 comprises a support body 3 to which the load carrying bar 2 is arranged. The support body 3 further comprises a support surface 4 adapted to rest against a first surface of a vehicle (not shown). The first surface of the vehicle can be a rail, or any surface on the roof, or any other suitable surface of the vehicle. The support surface 4 can be formed by an individual support member 5 as in the shown embodiment, or it can be integrally formed with the support body 3. A support member, like the support member 5, is preferably manufactured from a tough but lenient material having some elasticity and which is slightly compressible. A suitable material is rubber or a rubber like material, a thermoplastic material such as a polypropylene, or polyethylene based material. It is intended to provide for an increased friction between a support body of the load carrier foot, and the vehicle, e.g. a rail or the vehicle roof. It is further intended to prevent the rail or the vehicle roof from damage through tear and wear. The support member 5 can be mated with the support body 3 via protruding members and apertures on the support body 3, to retain the support member 5 to the support body 3.

A first bracket 6, or grip arm, is adapted to cooperate, e.g. grip about, a first surface of the vehicle, to retain the load carrier foot 1 to the vehicle. The load carrier foot 1 further comprises a second bracket 6' which is adapted to cooperate, e.g. grip about, a second surface of the vehicle, to retain the load carrier foot 1 to the vehicle. A tensioning arrangement 10 is adapted to impart the first bracket 6 and the second bracket 6' with a force so that a clamping force is formed between the first bracket 6, the second bracket 6' and the support surface 4, enabling them to cooperate in a clamping manner to retain the load carrier foot 1 to the vehicle. The support body 3 of the load carrier foot 1 carries the weight of the load and the load carrying bar 2 via the support surface 4. The first and the second brackets 6, 6' are pivotally connected to the support body 3, in the shown embodiment using a common connection axle 7. The tensioning arrangement 10, the first and the second brackets 6, 6' together with the support surface 4 provides for a tree point clamping function. The tree point clamping function clamps about the vehicle, in the shown embodiment about a rail of the vehicle, at three points or areas, and with three force components having different directions. Each point thus has a force component acting in a direction separate from the other two points during use.

Figure 2:
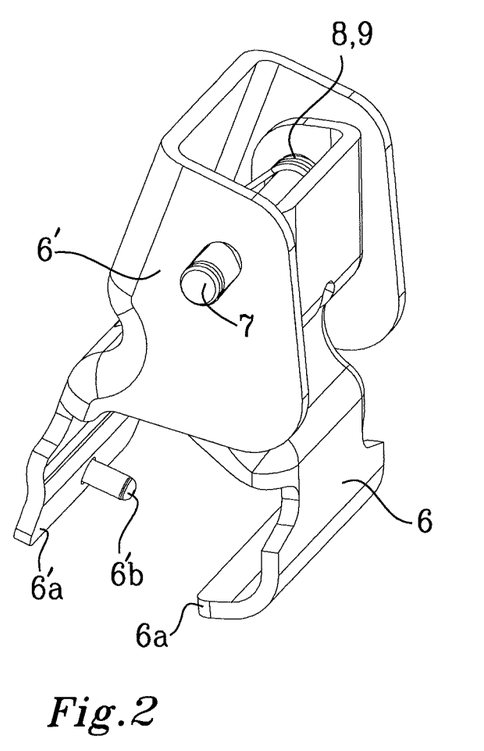
FIG. 2 shows the first and the second brackets of the load carrier foot of FIG. 2 in greater detail.

FIG. 2 shows the first and the second brackets 6, 6' in greater detail. FIG. 2 shows the connection axle 7 and a biasing member in the form of a spring 9, in this case a helical spring. The first bracket 6 and the second bracket 6' form a jaw like arrangement with a gap when seen as shown in FIG. 2. The biasing member 8 is adapted to bias the first and the second brackets 6, 6' away from each other, i.e. to keep the gap formed between the first and the second brackets 6, 6' open. Each of the brackets 6, 6' comprises an end 6a, 6'a defining the gap between the first and the second brackets 6, 6'. As is noticeable, the end 6'a of the second bracket 6' comprises a pin 6'b which is intended to be received in a cavity on the rail of the vehicle. The second bracket 6' can be similar or identic with the first bracket 6 however if desired. The support member 5, shown in FIG. 1, has pockets 5a, 5b for receiving the ends 6a, 6'a of the first and the second brackets 6, 6' respectively.

Figure 3:
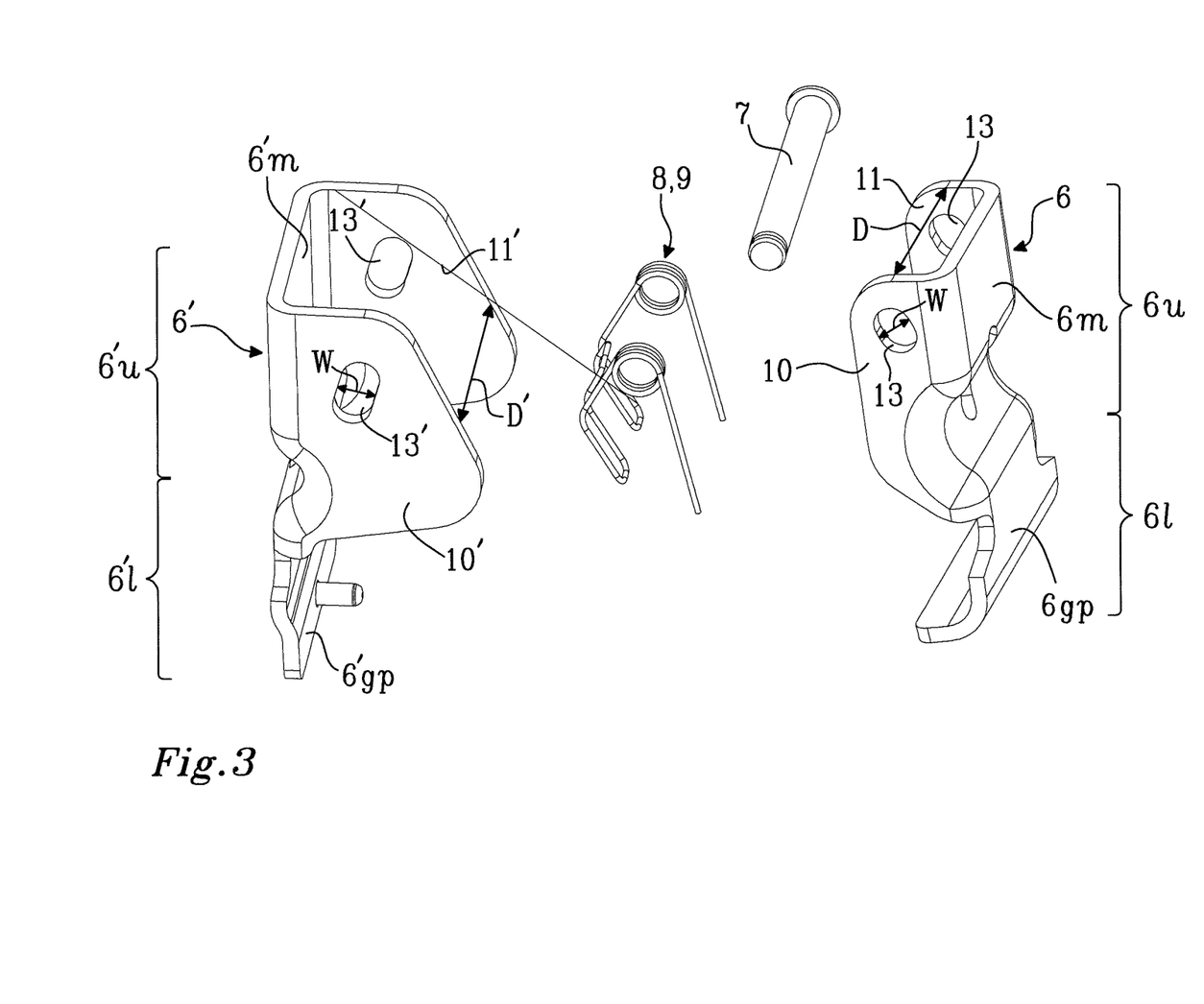
FIG. 3 shows the first and the second brackets of the load carrier foot of FIG. 2 in exploded view.

FIG. 3 shows FIG. 2 in an exploded view. As is noticeable, the first and the second brackets 6, 6' has an upper and a lower portion 6u, 6l, 6'u, 6'l. The upper portions 6u, 6'u of the first and the second brackets 6, 6' each comprises connection flanges 10, 11, 10', 11'. The connection flanges 10, 11, 10', 11' extends substantially perpendicular out from a main portion 6m, 6'm of the first and the second brackets 6, 6'. The main portion 6m and the two connection flanges 10, 11 of the first bracket thus 6 forms a U-like section adapted to mesh with the corresponding U-like section of the opposing second bracket 6' to provide rigidity to the first and the second brackets 6, 6' and the load carrier foot 1. The main portion of the first and the second brackets 6, 6' transcends to a grip portion 6gp, 6'gp, which is that part of the first and the second brackets which is intended to grasp about a portion of the vehicle. The grip portions 6gp, 6'gp can have different configurations as shown in the figure, or have the same configuration. The load carrier foot 1 thus has sections with overlapping material layers which are believed to structurally support the load carrier foot 1.

Each of the connection flanges 10, 11, 10', 11' of the first and the second brackets 6, 6' comprises an elongated aperture 13, 13', also referred to as connection apertures. The elongated apertures 13, 13' are adapted to receive the connection axle 7 and pivot about the connection axle 7 so that the load carrier foot 1 is easy to mount and dismount.

Further, the elongation of the elongated apertures 13, 13' permit the connection axle 7 to be displaced a distance defined by the elongation of the elongated apertures 13, 13'. As is noticed the elongated apertures 13, 13' have a width W which is slightly larger than the diameter of the connection axle 7. The width W is large enough to permit the connection axle 7 to slide inside of the elongated apertures 13, 13', but not too large so that unnecessary play is formed between the connection axle 7 and the sides of the elongated apertures 13, 13'. The length of the elongated apertures 13 of the first bracket 6 is slightly shorter than the elongation of the length of the elongated aperture 13 of the second bracket 6'. A suitable length of an elongated aperture 13, 13' is between 5-50 mm, optionally at least 1.5 times the length of the diameter of the connection axle. One or both of the first and the second brackets 6, 6' can be connected using an elongated aperture having an elongated extension as described above. The elongated apertures 13, 13' are further tilted with respect to each other. This will pull the first and the second bracket upwards when the tensioning arrangement 10 is used.

Figure 4:
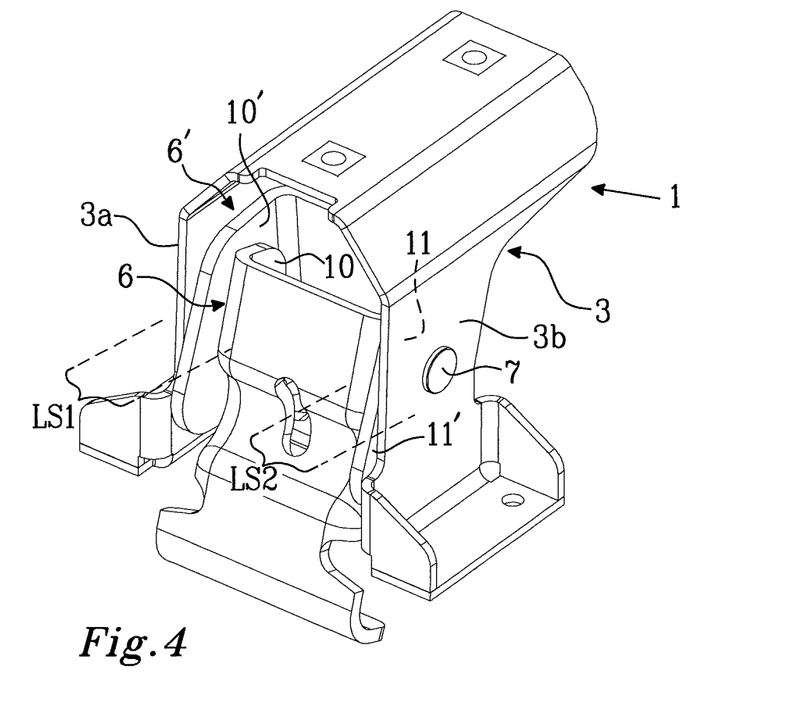
FIG. 4 shows the first and the second brackets of the load carrier foot of FIG. 2 and the support body of the load carrier foot being arranged in a layered structure.

FIG. 4 shows portions of the load carrier foot 1. FIG. 4 shows the support body 3, the connection axle 7 and the first and the second bracket 6, 6'. From left to right, the layers formed by each component is the support body 3, a first connection flange 10' of the second bracket 6', a first connection flange 10 of the first bracket 6, between the two connection flanges 10, 11 of the first bracket 6 is the biasing member 8 positioned in this case the spring 9 (not shown), thereafter the second connection flange 11 of the first bracket 6, the second connection flange 11' of the second bracket 6' and finally again the support body 3.

As can be noticeable in FIG. 4, the first and the second brackets 6, 6', and especially due to the connection flanges 10, 11, 10', 11' of the first and the second brackets 6, 6', forms layered sections, or sandwich sections. The load carrier foot 1 has a first and a second layered section LS1, LS2, each section is formed by three components. In a layered section, the support body 3, the first bracket 6 and the second bracket 6' are positioned adjacent each other in a sandwich structure. It is possible that a washer may be positioned between each material layer, it is still considered to be a layered section. The layered sections LS1, LS2 give the load carrier foot 1 enhanced stability and rigidity which is very important, especially during crash scenarios. It is believed without being bound by theory that the individual components in the layered sections support each other. Further, by using a common connection axle, such as the connection axle 7, an even better stability is provided to the load carrier foot 1.

In the embodiment shown in FIG. 4, the support body 3 has a first and a second side 3a, 3b. The support body 3 of the load carrier foot 1 has a U-shaped form, with the two sides 3a, 3b forming vertical walls on which the first and the second bracket 6, 6' are positioned to brace against. The first layered section LS1 is defined by the first side 3a of the support body 3 positioned adjacent the first connection flange 10 of the second bracket 6' which in turn is positioned adjacent the first connection flange 10 of the first bracket 6. In a similar manner, the second layered section LS2 is defined by the second connection flange 11 of the first bracket 6 which in turn is positioned adjacent the second connection flange 11' of the second bracket 6' which in turn is positioned adjacent the second side 3b of the support body 3. In the just mentioned embodiment, two layered sections with three layers are formed. In the layered section described herein, one layer is stationary and two layers are displaceable with respect to each other. After the load carrier foot 1 has been positioned on the vehicle roof, the support body 3 of the load carrier foot 1 is stationary and only the first and the second brackets are displaceable enough to tighten the brackets towards each other.

It should be noted that even though the first and the second brackets 6, 6' has two connection flanges 10, 11, 10', 11', the load carrier foot 1 can be provided with a first and a second bracket having only one connection flange, thus forming only one layered section.

In an embodiment, the connection flanges do not necessarily be positioned adjacent a side of the support body, as shown in FIG. 3. It may suffice that the connection flanges of the brackets are positioned adjacent each other, or that a connection flange of one bracket is positioned adjacent one side of the support body. In the just mentioned embodiment, a layered section with two layers is formed.

The first and the second brackets 6, 6' can be formed by sheet steel, such as pressed sheet steel. The support body 3 of the load carrier foot 1 can also be formed from sheet steel. Composites and reinforced plastic material may be used as alternative or in addition to sheet steel.

The load carrier foot 1 is retained to the vehicle using the first and the second brackets 6, 6'. A tensioning arrangement 10 is extending between the first and the second brackets 6, 6' which can be operated to permit the load carrier foot 1 to be mounted to a rail of a vehicle, and to permit the load carrier foot 1 to be dismounted from the rail of the vehicle.

In FIG. 4 the connection flanges 10, 10', 11', 11' of the first and the second brackets 6, 6' are arranged on the inside of the support body 3, i.e. between the first and the second sides 3a, 3b of the support body 3. In one embodiment, the support body 3 is arranged between the connection flanges of the first and/or the second brackets 6, 6'.

The load carrier foot 1 can further be provided with a secondary support body (not shown) arranged between the first connection flange 10 and the second connection flange 11 of the first bracket 6. A secondary support body would provide additional support surface to the vehicle, or support member, and towards the load carrying bar receiving portion of the support body 3. The load carrier foot 1 would in such an embodiment be provided with two 'four layered sections'. The connection axle 7 would in such an embodiment extend through apertures on the secondary support body in a similar manner as in the connection flanges, although such apertures would have a diameter just slightly larger than the diameter of the connection axle 7.

Figure 5:
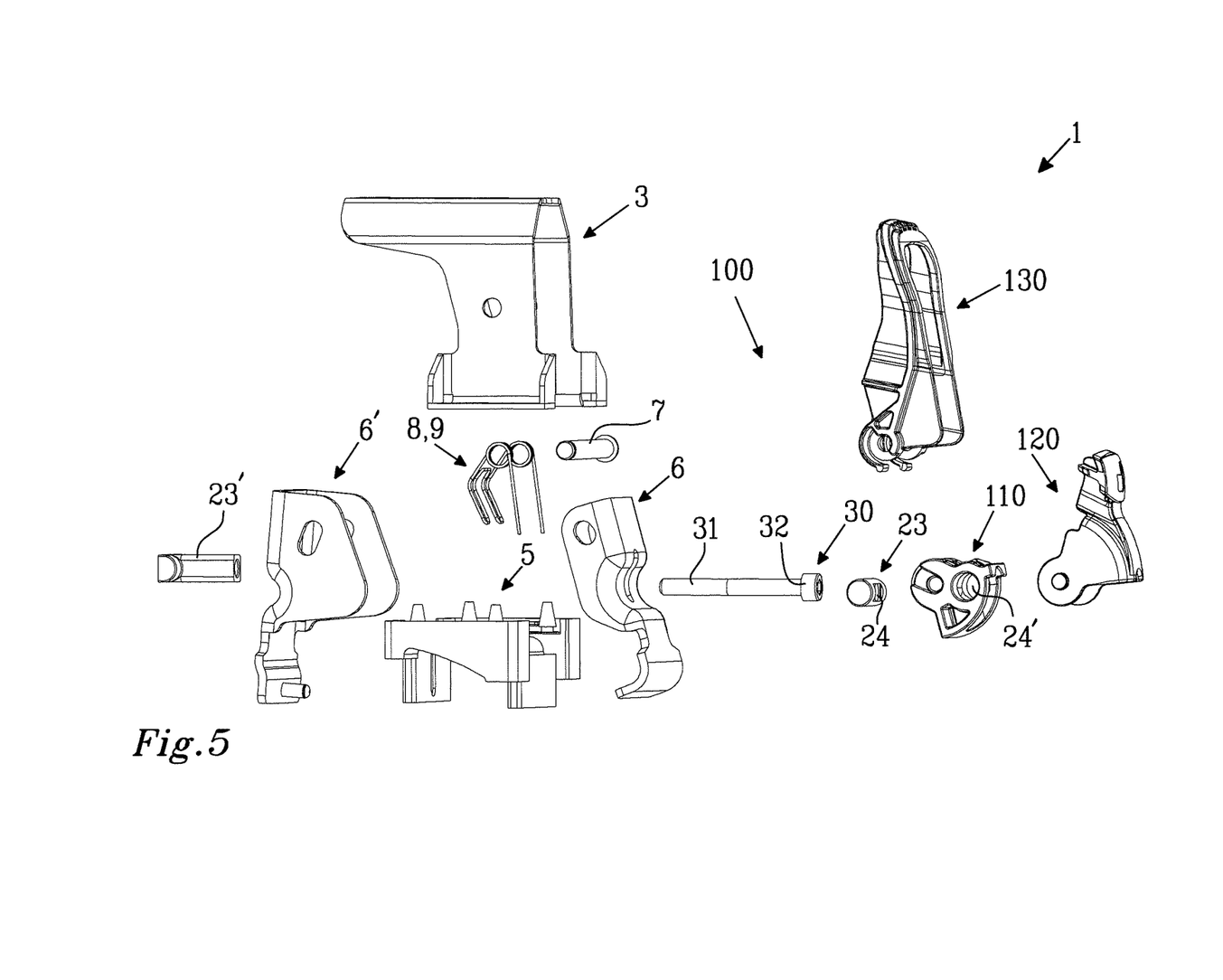
FIG. 5 shows the load carrier foot of FIG. 1 in exploded view.

FIG. 5 shows the load carrier foot 1 in exploded view. FIG. 5 shows the support body 3, the support member 5, the first and the second bracket 6, 6', the connection axle 7 and the biasing member 8 in the form of a spring 9. FIG. 5 further shows the tensioning arrangement 100. The tensioning arrangement 100 in the shown embodiment comprises a cam member 110, a release member 120, a lever 130, a screw 30 and a first and a second pin 23, 23'. The pin 23 comprises an aperture 24 which can be connected to the cam member 110 via an aperture 24'. The aperture 24 of the pin 23 is adapted to receive the screw 30 making the screw 30 pivotally connected to the cam member 110. The screw 30 comprises a threaded end 31 and a head 32. The threaded end 31 is adapted to be threadably engaged with the pin 23'. As is noticed, the pin 23' has a T-shaped form so that it is permitted to engage the second bracket 6' while still permit the length of the screw 30 to be adjusted if desired.

The function of the tensioning arrangement 100 will be described in greater detail hereafter with reference to a load carrier foot 1 similar to the load carrier foot 1 shown in FIG. 1 but with a slightly modified cam member 110 and lever 130.

Figure 6:
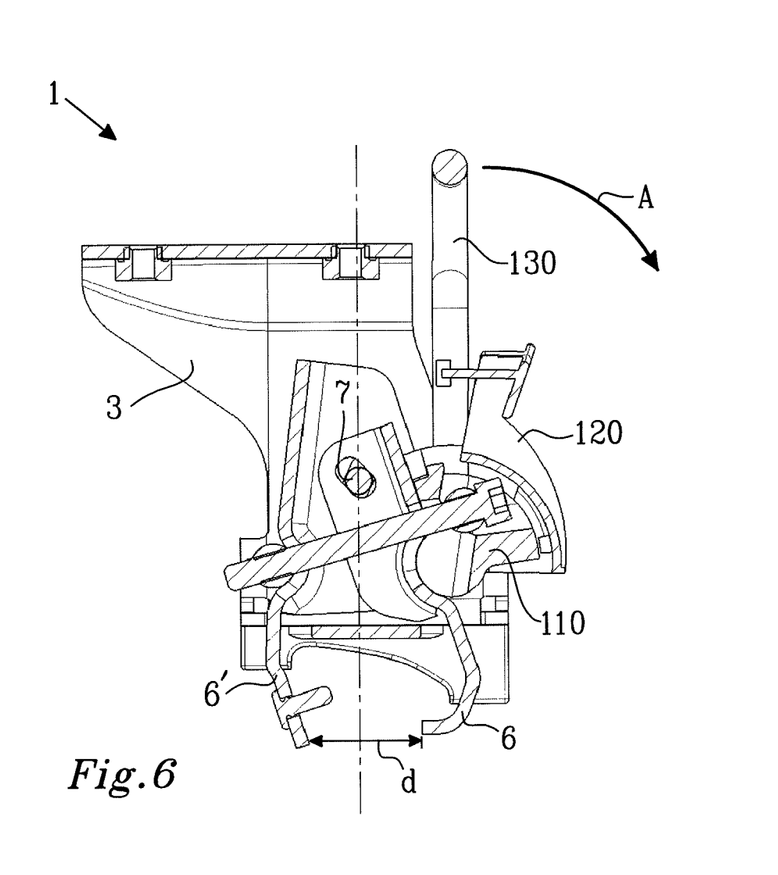
FIG. 6 shows a second embodiment of a load carrier foot having the lever of the tensioning arrangement positioned in the storage position, and the cam member in a release position.

FIG. 6 shows a cross section of the load carrier foot 1. In FIG. 6 the lever 130 is positioned in a storage position, or in a ready to mount position, and the cam member 110 is in a released position. The load carrier foot 1 is ready to be mounted to a rail of a vehicle, the brackets 6, 6' are "opened" in the sense that the distance between the ends 6a, 6'a of the brackets 6, 6' are separated a distance D1, enough for the load carrier foot 1 to be mounted to the rail of the vehicle in an easy manner. FIG. 6 shows the support body 3, the first bracket 6, the second bracket 6', the connection axle 7 and the biasing member 8 in the form of a spring 9. The load carrying bar is not shown in FIG. 6. The cam member 110 is intended to press or brace against the first bracket 6 to impart the clamping force and operates as an eccentric in terms of that the rotational motion of the lever 130 is transferred to a displacement of the first bracket 6 towards the second bracket 6', i.e. a translation of the first bracket 6 with respect to the second bracket 6' is achieved.

The cam member 110 comprises a cam surface 40, or eccentric surface, adapted to brace against a surface of the first bracket 6. The cam surface 40 has a convex form with respect to the first bracket 6, as shown in FIG. 6. In the shown embodiment, the cam surface 40 has a radius curvature.

Figure 7:
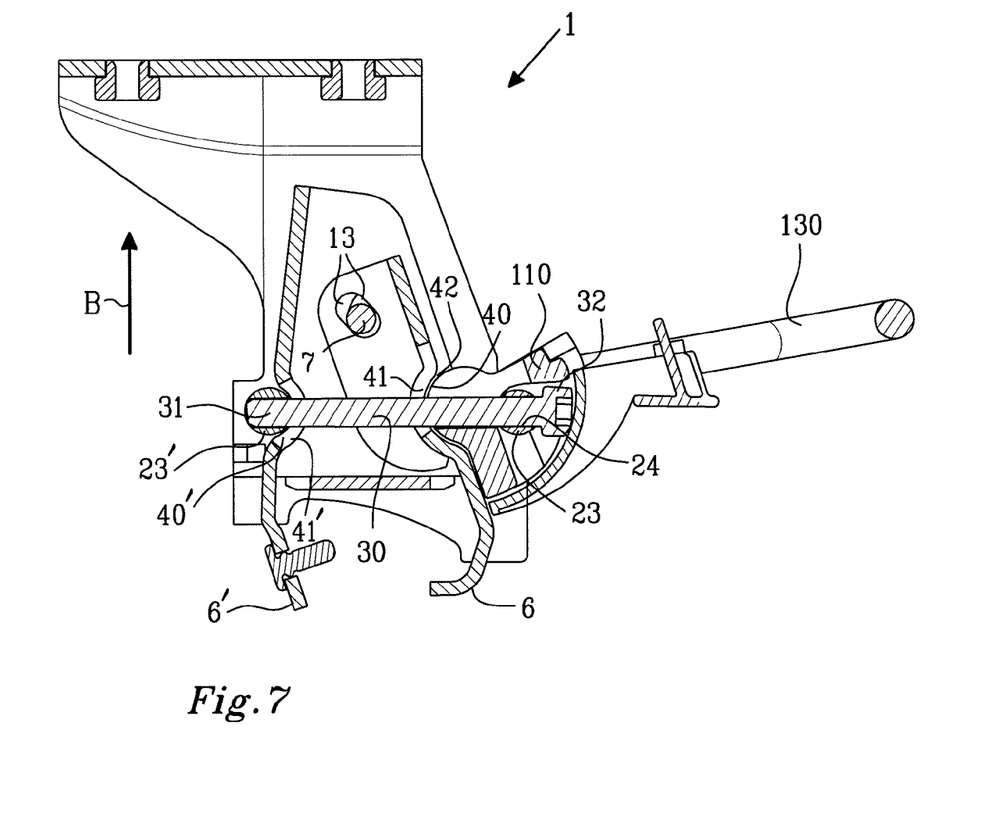
FIG. 7 shows the load carrier foot of FIG. 6, the lever of the tensioning arrangement is positioned in the tightened position and the cam member is in a tightened position.

To operate the tensioning arrangement 100 of a user pivots the lever 130 downwards in a clock wise direction as indicated with the arrow A in FIG. 6, to position the lever 130 in a tightened position, as shown in FIG. 7. While the lever 130 is pivoted, the cam member 110 pivots with the lever 130 so that the cam member 110 imparts a force to the first bracket 6 acting to decrease the distance d between the first and the second brackets 6, 6'. As the screw 30 pass the point of maximum tension imparted by the cam member 110, the position of the cam member 110 by the imparted force in the screw 30. Due to the angle of the elongated apertures 13 of the first and the second brackets 6, 6', by which the first and the second brackets 6, 6' are connected to the support body 3, the first and the second brackets 6, 6' are also displaced slightly upwards as indicated with the arrow B. As a result, the load carrier foot 1 is readily retained e.g. to a rail of the vehicle.

Figure 8:
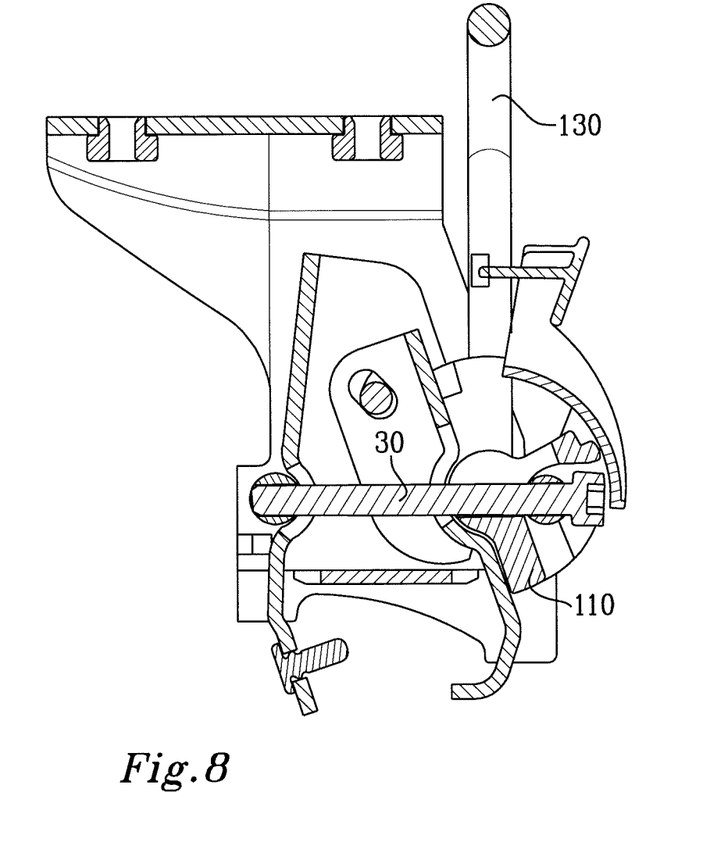
FIG. 8 shows the load carrier foot of FIG. 6, the lever of the tensioning arrangement is positioned in the storage position and the cam member is in the tightened position.

When the user has pulled the lever 130 downwards to the tightened position and the cam member 110, the user can return the lever 130 to a storage position as shown in FIG. 8. The cam member 110 remains in a tightened position.

Figure 9:
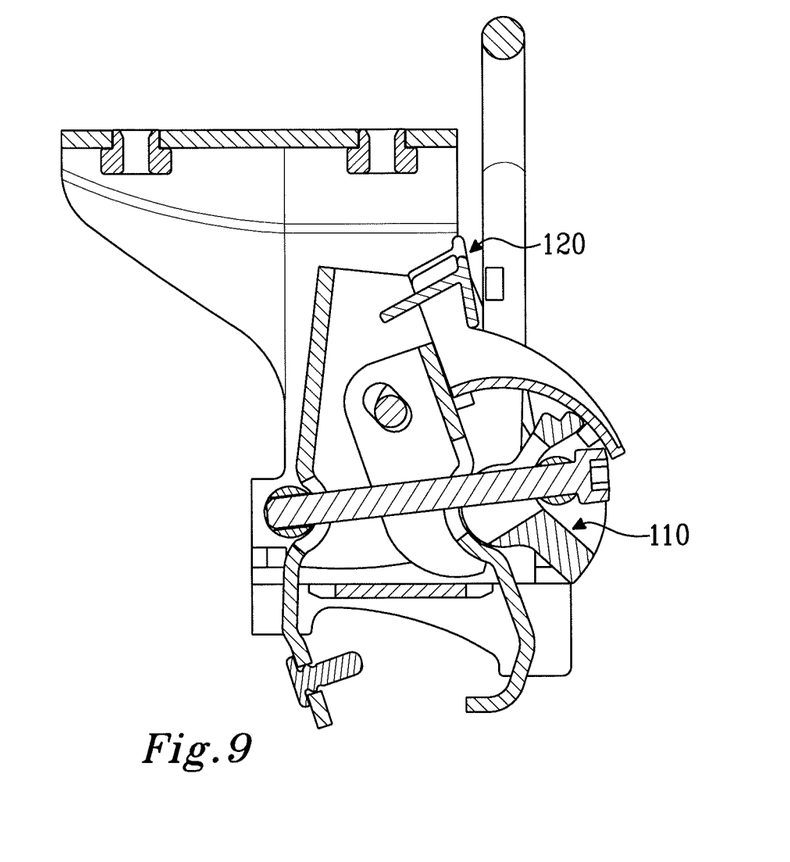
FIG. 9 shows the load carrier foot of FIG. 6, the lever of the tensioning arrangement is positioned in the storage position and the cam member is in the released position upon operation of the release member.

To release the cam member 110 from the tightened position so that the load carrier foot 1 can be dismounted, the release member 120 is pushed in a counter clock wise direction, as shown in FIG. 9 whereby the release member 120 displaces the cam member 110 from the tightened position.

The release member 120 can be integrally formed with the lever 130 or be pivotally connected to the lever 130. The release member 120 is configured to release the imparted pressure by the cam member 110. The lever 130 is formed by form molded plastic but could be formed by a bent rod or in a variety of different forms and shapes. The purpose is to provide a user with a grip by which the user can impart the necessary force to the cam member 110, a force high enough for the cam member 110 to rotate and translate the rotational motion to a displacement of the first bracket 6 relative to the second bracket 6'.

The cam member 110 and the lever 130 are pivotally connected to each other. A pin 23 with an aperture 24 is pivotally connected to the cam member 110. The aperture 24 of the pin 23 is adapted to receive a screw 30, making the screw 30 pivotally connected to the cam member 110. The cam member 110 is pivotally arranged to the first bracket 6 via screw 30 and configured to impart the first bracket 6 with a force upon rotation of the cam member 110 using the lever 130.

As is noted, the cam member 110 is arranged in a cavity 40 of the first bracket 6. The cavity 40 provides the cam member 110 with a ridge 42 to which the cam member 110 can use as cam surface and brace towards. The screw 30 extends through an aperture 41 arranged in the cavity 40 of the first bracket 6. In the shown embodiment, the aperture 41 extends across the ridge 42 so that the screw 30 can be displaced between different positions along the length of the aperture 41 of the first bracket 6 as will be described below.

A cam member, such as the cam member 110 disclosed herein, is advantageously selected from a material which can withstand wear, tear and the torque imparted by the user. A strong plastic material or a reinforced plastic material can be used, optionally a metal preferably steel or aluminum.

The screw 30 comprises a threaded end 31 and a head 32. The threaded end 31 is adapted to be threadably engaged with a second pin 23', similar to the pin 23. Instead of being threadably engaged, the second pin 23' can be attached by other means such as by welding, pinching or the like. The second pin 23' is however pivotable with respect to the second bracket 6'. In the shown embodiment, the second pin 23' is not attached to the second bracket 6' but retained thereto by means of the screw 30.

The second bracket 6' also comprises a cavity 40' formed by a portion of the bracket 6'. The second pin 23' is arranged in the cavity 40'. The cavity 40' extends towards the first bracket 6, and thus forms a protrusion on the first bracket facing side of the second bracket 6'. An aperture 41' is arranged substantially in the cavity 40'. The screw 30 further extends through the aperture 41' arranged in the second bracket 6'. As is noteable, the aperture 41' substantially extends across the cavity 40' permitting the screw 30 to pivot, or at least across what is to be considered as the bottom, of the cavity 40'.

The load carrier foot 1 shown in FIGS. 1-7 has two brackets 6, 6'. In the shown embodiment, each of the two brackets 6, 6' has a cavity 40, 40' comprising an aperture 41, 41' for receiving a portion of the tensioning arrangement 10. One cavity, in this case the cavity 40' of the second bracket 6', is arranged in working cooperation with one end of the screw, and the other cavity, in this case the cavity 40 of the first bracket 6 is in working cooperation with the cam member 110 of the tensioning arrangement 100.

The invention claimed is:

1. A load carrier foot, comprising:
a support body comprising a support surface configured to rest against a first surface of a vehicle, a first pivotable bracket configured to grip about a second surface of said vehicle, a second pivotable bracket configured to grip about a third surface of said vehicle, and a tensioning arrangement configured to impart a clamping force between said support surface and said first and said second pivotable brackets to retain said load carrier foot to said vehicle,
wherein said first and said second pivotable brackets are pivotally connected to each other,
wherein said first pivotable bracket comprises a first connection flange extending substantially perpendicular from a main portion of said first pivotable bracket,
wherein said second pivotable bracket comprises a first connection flange extending substantially perpendicular from a main portion of said second pivotable bracket, and
wherein said first connection flange of said first pivotable bracket and said first connection flange of said second pivotable bracket extend parallel with respect to each other.

2. The load carrier foot according to claim 1, wherein at least one of said first and said second pivotable brackets are pivotally connected to said support body of said load carrier foot.

3. The load carrier foot according to claim 1, wherein said first and said second pivotable brackets are pivotally connected to said support body at one or more common connection points.

4. The load carrier foot according to claim 3, wherein said first and said second pivotable brackets are pivotally connected to said support body with one or more common connection axles.

5. The load carrier foot according to claim 4, wherein said first and said second pivotable brackets are pivotally connected to said support body with a single common connection axle.

6. The load carrier foot according to claim 1, wherein said first pivotable bracket comprises an elongated aperture configured to receive a connection axle, wherein said first pivotable bracket is configured to be displaced a distance defined by said elongated aperture of said first pivotable bracket and said connection axle.

7. The load carrier foot according to claim 6, wherein said second pivotable bracket comprises an elongated aperture configured to receive a connection axle, wherein said second pivotable bracket is configured to be displaced a distance defined by said elongated aperture of said second pivotable bracket and said connection axle.

8. The load carrier foot according to claim 7, wherein said elongated aperture of said first pivotable bracket has an extension which is longer than said elongated aperture of said second pivotable bracket.

9. The load carrier foot according to claim 1, wherein said tensioning arrangement comprises an elongated member extending between said first and said second pivotable brackets, and a cam member connected to said elongated member.

10. The load carrier foot according to claim 1, wherein said first and second pivotable brackets each comprise a second connection flange,
wherein said first connection flange of said first pivotable bracket is positioned adjacent to said second connection flange of said second pivotable bracket, and
wherein said first connection flange of said second pivotable bracket is positioned adjacent to said second connection flange of said first pivotable bracket.

11. The load carrier foot according to claim 1, wherein said first and said second pivotable bracket each comprise a first and a second connection flange, wherein said first and said second connection flanges of said first and second pivotable brackets are arranged at opposing sides of said main portions of said first and said second pivotable brackets.

12. The load carrier foot according to claim 1, wherein said load carrier foot comprises a secondary support body, wherein said secondary support body is positioned between a portion of said first or said second pivotable bracket.

13. A load carrier foot, comprising:
a support body comprising a support surface configured to rest against a first surface of a vehicle, a first pivotable bracket configured to grip about a second surface of said vehicle, a second pivotable bracket configured to grip about a third surface of said vehicle, and a tensioning arrangement configured to impart a clamping force between said support surface and said first and said second pivotable brackets to retain said load carrier foot to said vehicle,
wherein said tensioning arrangement comprises an elongated member extending between said first and said second pivotable brackets, and a cam member connected to said elongated member, and
wherein each of said first and said second pivotable brackets comprises at least two connection flanges, wherein said connection flanges of said first pivotable bracket are positioned adjacent said connection flanges of said second pivotable bracket.

14. The load carrier foot according to claim 13, wherein said connection flanges of said second pivotable bracket are positioned adjacent said support body of said load carrier foot.

15. The load carrier foot according to claim 13, wherein said first pivotable bracket is disposed between said support body and said second pivotable bracket such that said support body forms a first layer, said first pivotable bracket forms a second layer, and said second pivotable bracket forms a third layer.

16. The load carrier foot according to claim 13, wherein said tensioning arrangement further comprises:
   a lever coupled to said cam member; and
   a release member coupled to said cam member.

17. The load carrier foot according to claim 16, wherein said release member is configured to displace said cam member from said tightened position.

18. The load carrier foot according to claim 16, wherein said lever is configured to pivot from a storage position to a tightened position.

19. The load carrier foot according to claim 18, wherein pivoting said lever into said tightened position pivots said cam member into a tightened position, and
   wherein said tightened position of said cam member imparts a force to said first pivotable bracket, thereby decreasing a distance between said first pivotable bracket and said second pivotable bracket.

20. The load carrier foot according to claim 19, wherein said cam member remains in said tightened position when said lever is returned to said storage position.

21. A load carrier foot, comprising:
   a support body comprising a support surface configured to rest against a first surface of a vehicle, a first pivotable bracket configured to grip about a second surface of said vehicle, a second pivotable bracket configured to grip about a third surface of said vehicle, and a tensioning arrangement configured to impart a clamping force between said support surface and said first and said second pivotable brackets to retain said load carrier foot to said vehicle,
   wherein said first and said second pivotable brackets are pivotally connected to each other, and
   wherein said tensioning arrangement comprises an elongated member extending between said first and said second pivotable brackets, and a cam member connected to said elongated member.

* * * * *